US007071802B2

(12) United States Patent
Hiromori

(10) Patent No.: US 7,071,802 B2
(45) Date of Patent: Jul. 4, 2006

(54) MAGNETIC DEVICE

(75) Inventor: Junji Hiromori, Tokyo (JP)

(73) Assignee: Hiromori Corporation, Tokyo (JP)

( * ) Notice: Subject to any disclaimer, the term of this patent is extended or adjusted under 35 U.S.C. 154(b) by 0 days.

(21) Appl. No.: 10/836,035

(22) Filed: Apr. 30, 2004

(65) Prior Publication Data

US 2005/0242911 A1   Nov. 3, 2005

(51) Int. Cl.
  *H01F 7/02* (2006.01)
(52) U.S. Cl. ...................... 335/306; 335/302
(58) Field of Classification Search ........ 335/302–306; 40/600, 92; 273/109
  See application file for complete search history.

(56) References Cited

U.S. PATENT DOCUMENTS

| 2,524,546 | A | * | 10/1950 | Sinclaire | ............ 473/570 |
| 2,665,912 | A | * | 1/1954 | Juran | ............ 273/118 A |
| 3,601,921 | A | * | 8/1971 | Strohmaier | ............ 446/92 |
| 4,741,534 | A | * | 5/1988 | Rogahn | ............ 273/157 R |
| 4,822,044 | A | * | 4/1989 | Perkitny | ............ 273/109 |
| 5,347,253 | A | * | 9/1994 | Ogikubo | ............ 335/302 |

* cited by examiner

*Primary Examiner*—Lincoln Donovan
(74) *Attorney, Agent, or Firm*—Dilworth & Barrese LLP

(57) ABSTRACT

An improved magnetic device is provided for adhering to an outer magnetic or magnetizable surface in a secure, reliable manner, by ensuring proper orientation of a magnet contained therein at all times.

20 Claims, 2 Drawing Sheets

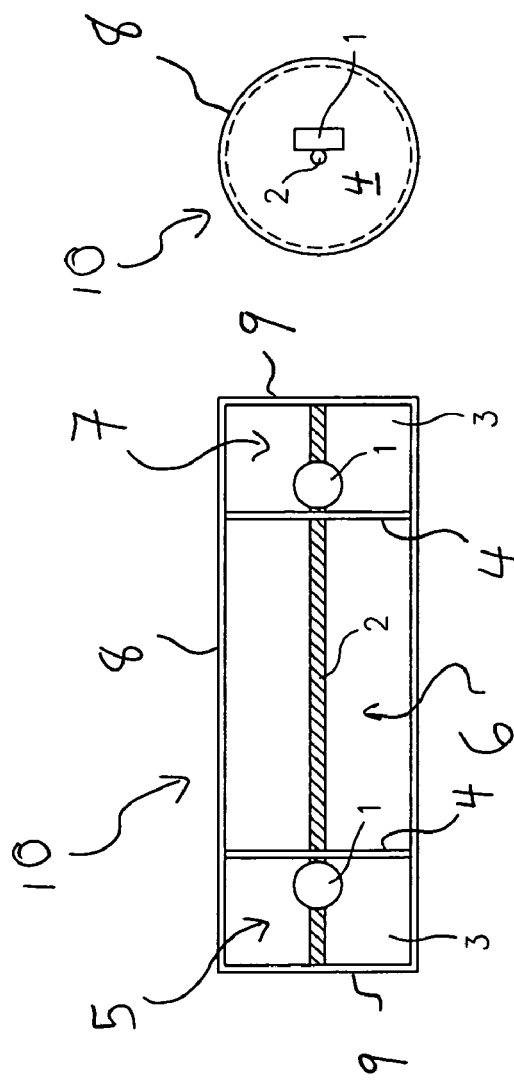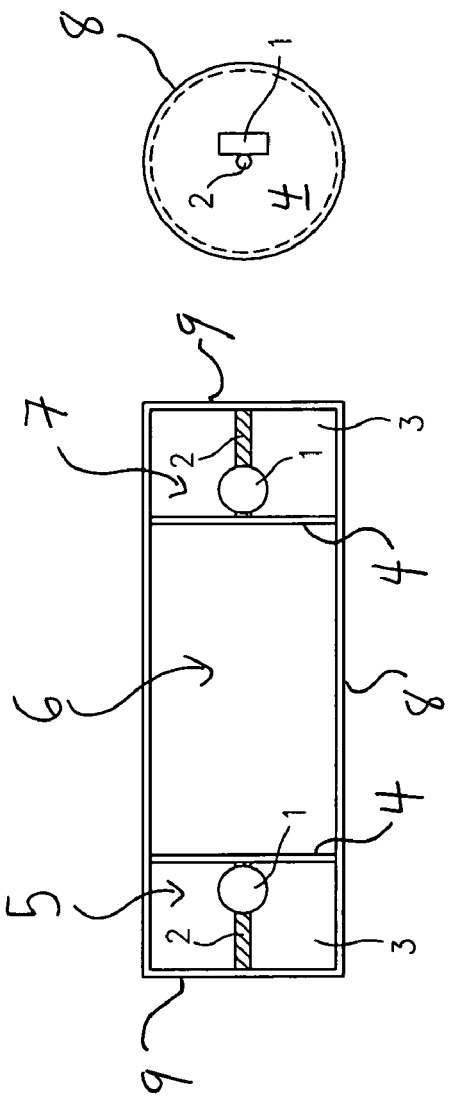

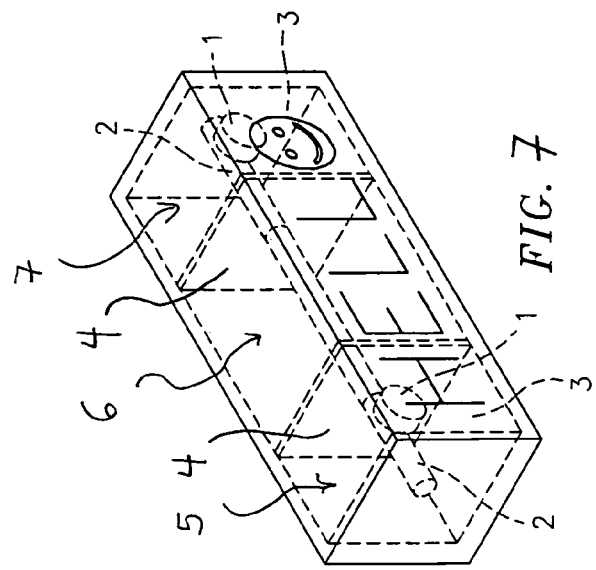
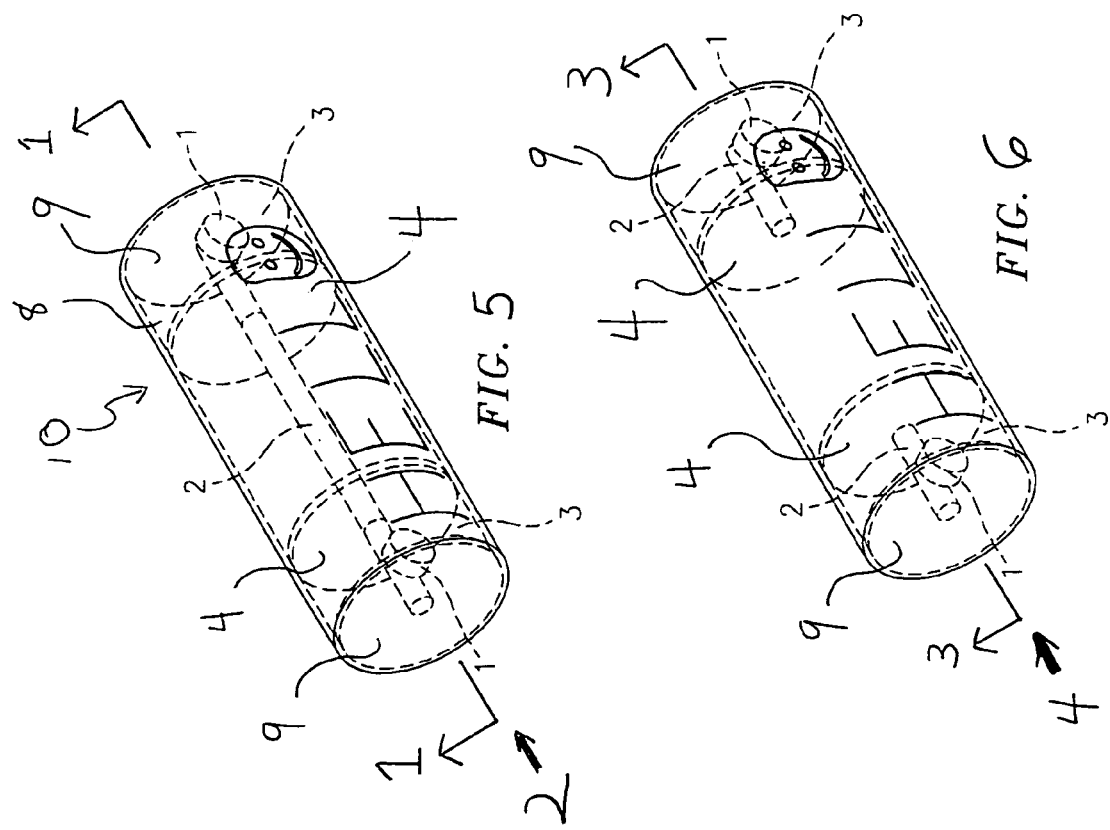

MAGNETIC DEVICE

BACKGROUND OF THE PRESENT INVENTION

The present invention is directed to an improved magnet device for adhering to a magnetic or magnetizable surface and retaining, e.g., articles such as paper between the device and surface, whereby reliability of magnetic attraction and ultimate retention against the surface is improved.

Various devices for magnetically adhering to surfaces are known, e.g., magnets for adhering to refrigerators, etc. In this regard, structures containing permanent magnets are also known, e.g., U.S. Pat. No. 5,347,253 showing a block having a magnetic body therein and U.S. Pat. No. 4,741,534 showing a block having a metal ball therein which can be attracted to magnetic objects. Furthermore, U.S. application Ser. No. 10/642,312 filed Aug. 15, 2003, the contents of which are incorporated by reference herein, discloses various embodiments of devices containing permanent magnets and in various polygonal shapes, whereby the respective devices can adhere to an outer magnetic/magnetizable surface to display decorative patterns and/or lettering imprinted thereon.

The permanent magnets found in these devices can take any number of shapes but are preferably disk-shaped with the primary magnetic lines of force emanating from and around the flat circular surfaces of the magnets. Accordingly, the magnets in such devices can generally rest against any of the surfaces of the container therefor, e.g., with the flat surface of the disk-shaped magnet resting against an inner flat surface of a chamber containing the same, in the absence of an outer magnetic/magnetizable surface nearby. When the device is then brought close to the magnetic/magnetizable surface, the magnet inside the container will then "jump" or "flip", i.e., be attracted to the outer surface through the adjacent wall of the container. Normally, the magnet might turn as much as 90 degrees, i.e., a right angle, to orient the flat circular surface thereof against a wall of the container extending normally to the wall against which the flat circular surface of the magnet had previously rested.

However, it has been found where a magnet is, e.g., substantially in the shape of a disk and resting against one interior surface of the container, the magnet does not necessarily easily turn 90 degrees to face a normally-extending surface of the container that is brought against an outer magnetic/magnetizable surface such as a steel surface. This is especially true where the outer container is in the shape of a cylinder or spindle and the normal surface is the longitudinally-extending curved surface of the spindle. Accordingly, magnetic attraction between the contained magnet and outer steel surface might not be reliably ensured, with it being necessary for a user to shake the device to properly orient the magnet therein (such shaking could easily damage the magnetic device). This 90 degree turning of a disk-shaped magnet is especially problematic the closer in shape to a cylinder or spindle the main body of the device containing the magnet.

SUMMARY OF THE INVENTION

Accordingly, it is an object of the present invention to improve magnetic attraction between two surfaces.

It is also an object of the present invention to improve reliability of magnetic attraction between two surfaces.

It is another an object of the present invention to facilitate retention and positioning of a device against an outer surface, e.g., by magnetic attraction, and improve reliability of such retention.

It is a further object of the present invention to facilitate retention of various articles between two surfaces, e.g., by positioning these articles in a magnetic force field.

It is still another object of the present invention reduce danger of damage to a magnetic device by properly orienting at least one magnet within the same to ensure proper magnetic attraction without shaking the device.

These and other objects are accomplished by the present invention which is directed to a device for adhering to a magnetic and/or magnetizable surface such as a steel surface and having a chamber structured and arranged for containing at least one magnet therein, a magnet movably and adjustably positioned within the chamber, and means positioned within the chamber for orienting the magnet to face a discrete outer surface of the chamber. The magnet will then be attracted to the outer steel surface through this discrete outer surface when the device is brought close. In particular, this means are constituted by a rod extending substantially-centrally through the chamber and oriented such that the magnet, which is preferably disk-shaped, will revolve around the rod upon a curved surface of the magnet so that the flat circular surface, from which magnet lines of force emanate, will always face the outer discrete surface of the chamber.

Preferably, the device comprises several chambers with magnets positioned within some (but not necessarily all) of the chambers. The rod can extend through all such chambers, or alternatively separate rods can each extend only through the chambers containing the magnets. Furthermore, the device itself is preferably in the shape of a hollow spindle or cylinder, but can also be multi-faceted, i.e., polygonally-shaped.

BRIEF DESCRIPTION OF THE DRAWINGS

The present invention will be described in greater detail with reference to the accompanying drawings in which FIG. 1 is a sectional view in the direction of arrows 1—1 in FIG. 5 and illustrating one embodiment of the device according to the present invention;

FIG. 2 is an end view of the inventive device in the direction of arrow 2 in FIG. 5;

FIG. 3 is a sectional view similar to FIG. 1 in the direction of arrows 3—3 in FIG. 6 and illustrating an alternative embodiment of the device according to the present invention;

FIG. 4 is an end view similar to FIG. 2 in the direction of arrow 4 in FIG. 6;

FIG. 5 is a perspective view of the embodiment of the device according to the present invention illustrated in FIGS. 1 and 2;

FIG. 6 is a perspective view of the alternative embodiment of the device according to the present invention illustrated in FIGS. 3 and 4; and FIG. 7 is a perspective view similar to FIGS. 5 and 6 and illustrating a further embodiment of the device according to the present invention.

DESCRIPTION OF THE PREFERRED EMBODIMENTS

Referring the present invention in which similar components have been denoted by the same reference numerals, FIGS. 1, 2 and 5 illustrate one embodiment of the device 10 substantially in the shape of a hollow spindle or cylinder and constructed, e.g., from transparent plastic. Decorative lettering and/or patterning can appear upon the outer surface of the spindle or cylinder, e.g., along the curved, longitudinally-extending surface 8 as illustrated. Partitions 4 respectively divide the interior chambers 5, 6 and 7 from one another in the longitudinal direction, with disk-shaped magnets 1 being positioned in the two outer chambers 5 and 7 bordering the central chamber 6 in the longitudinal direction and which does not contain a magnet in the illustrated embodiment. Alternatively, a magnet can be easily positioned within this central chamber 6 within the context of the present invention.

A single rod 2 extends entirely across all three chambers 5–7 in the embodiment shown in FIGS. 1, 2 and 5. This rod 2 serves to orient the disk-shaped magnets 1 to be balanced upon the respective curved cylindrical surfaces thereof as best seen in FIG. 2. The substantially flat surface of the respective disk-shaped magnet 1 is then oriented to be attracted to an outer magnetic and/or magnetizable surface when the device 10 is brought near the same and then attract and adhere the device 10 to this surface along the curved, longitudinal surface 8 of the cylinder or spindle 10. Thus, for example, the inventive device can adhere to a magnet or magnetizable surface to display the decorative lettering and/or patterning seen in the perspective view of FIG. 5.

FIGS. 3, 4 and 6 illustrate an embodiment similar to FIGS. 1, 2 and 5 but where the rod 2 has been broken into two separate segments 2, 2, each segment 2 only extending into a respective longitudinal chamber 5 or 7 containing a respective magnet 1. This embodiment accomplishes the same effective orientation of the contained magnets 1 as the embodiment illustrated in FIGS. 1, 2 and 5, but avoiding need to extend a rod through the central "nonmagnetic" chamber 6 and thereby conserving material (the rod 2 is fabricated from nonmagnetic material, preferably plastic, to avoid interferring with the magnet 1 being attracted to the outer cylindrical surface 8 of the device 10 when brought near a magnetic or magnetizable surface). Alternatively, the embodiment shown in FIGS. 1, 2, and 5 might be easier to assemble as requiring insertion of just a single rod 2 through all chambers 5–7 from one end surface 9 of the device 10.

FIG. 7 illustrates a further embodiment similar to FIGS. 1–6 but where the device 10 is polygonally-shaped, i.e., as a rectangular parallelepiped. This embodiment has been illustrated with just a single rod 2 extending across all three chambers 5–7 however an embodiment containing separate rods 2 positioned within just the outer end chambers 5 and 7 containing magnets 1 can easily be prepared within the context of the present invention.

With the present invention, as the device 10 is brought close to an outer magnetic or magnetizable surface, the magnets 1 retained within the respective chambers revolve about the centrally-positioned rod 2, i.e., revolve facing the longitudinal direction of the main body of the device. Therefore, when the inventive device 10 is brought close to the magnetic/magnetizable surface, e.g., a steel wall, the magnet 1 moves in a direction substantially parallel to the magnetic force lines emanating from a surface of the magnet 1 and is thereby attracted to the outer steel surface, by being attracted to the outer, longitudinally-extending surface 8 of the device 10, to ultimately retain the device 10 against the outer steel surface. As a result, strong magnetic retentive force can be maintained even if the shape of the main body of the device 10 is a cylinder having a curved surface 8.

The inventive device can be used as a paper holder for clamping paper or the like between the same and an outer steel surface. This clamping can be accomplished, e.g., to display the decorative patterns and/or lettering as shown in the figures. The inventive device can be fabricated from conventional material, e.g., transparent plastic forming the outer container having the outer longitudinal and end surfaces 8 and 9, with the control rod 2 also being fabricated from plastic and disk-shaped permanent magnets 1 also being conventionally-available. The inventive device can also be fabricated with any required dimensions, but are preferably formed to ensure the disk-shaped magnets 1 remain balanced upon their curved surfaces about the rod 2 and not turn to be situated with the flat surfaces thereof positioned against the end surfaces 9 (although such positioning whereby the device 10 can magnetically adhere to an outer steel surface at end surfaces 9 is certainly contemplated within the context of the present invention).

The preceding description of the present invention is merely exemplary and is not intended to limit the scope thereof in any way.

What is claimed is:

1. A device for adhering to a magnetic or magnetizable surface, comprising
   an elongated housing defining a longitudinal axis,
   a chamber structured and arranged for containing at least one magnet therein,
   a magnet adjustably positioned within said chamber, and
   axially extending support means positioned within said chamber for orienting said magnet to face a discrete outer surface of said chamber, said magnet abutting an exterior circumferential surface of said support means to be oriented.

2. The device of claim 1 wherein said support means comprises a cylindrical rod extending across said chamber, said magnet being movable with respect to the rod.

3. The device of claim 1 wherein said chamber is cylindrical or polygonal in shape.

4. The device of claim 1 comprising a plurality of chambers, with a magnet being positioned in at least one of said chambers.

5. The device of claim 4 comprising three chambers, with magnets being respectively positioned in at least two of said three chambers.

6. The device of claim 5 wherein said magnets are only positioned within two outer chambers respectively bordering a central chamber.

7. The device of claim 6, substantially in the shape of a hollow spindle or cylinder and comprising interior partitions separating said respective chambers from one another.

8. The device of claim 6, substantially in the shape of a hollow multifaceted polygon and comprising interior partitions separating said respective chambers from one another.

9. The device of claim 8 substantially in the shape of a rectangular parallelepiped.

10. The device of claim 6 wherein said means are constituted by a rod extending across all three said chambers.

11. The device of claim 6 wherein said means are constituted by separate rods each extending only across said respective chambers containing said magnets.

12. The device of claim 1 wherein said magnet is substantially in the shape of a cylinder or disk.

13. The device of claim 2 wherein said rod is constructed of nonmagnetic material such as plastic.

14. The device of claim 1, additionally comprising images in the form of letters and/or patterns positioned upon an outer surface of said device.

15. The device of claim 14 wherein said images are positioned upon at least one of said discrete outer surface which forms a surface structured and arranged to contact the magnetic or magnetizable surface, and another surface which is not so structured and arranged to contact the magnetic or magnetizable surface.

16. The device of claim 2, wherein said rod extends in a longitudinal direction along said device and interior chamber, such that said magnet contained within said chamber is oriented erectly in the longitudinal direction.

17. The device of claim 16, substantially in the shape of a hollow cylindrical or polygonal spindle.

18. The device of claim 17, divided into at least three said chambers, with magnets positioned within at least two of said chambers and in the form of disks such that said rod orients said magnets to face a longitudinally-extending surface of said spindle which thereby forms a contact surface for the magnetic or magnetizable surface.

19. The device of claim 18, wherein said means comprise two separate rods, each said rod extending through a respective outer chamber bordering an inner central chamber in the longitudinal direction, and with said magnets being positioned only within said two respective outer chambers.

20. The device of claim 18, wherein said means comprise a single rod extending across all said chambers in the longitudinal direction.

* * * * *